United States Patent
Rodrigues et al.

(10) Patent No.: US 8,929,646 B2
(45) Date of Patent: *Jan. 6, 2015

(54) SYSTEM FOR PRODUCING AND DELIVERING MATCHING COLOR COATING AND USE THEREOF

(75) Inventors: Allan Blasé Joseph Rodrigues, Bloomfield Hills, MI (US); Daniel A Benton, Wilmington, DE (US); Gerard T Brosmer, Wilmington, DE (US); Larry Eugene Steenhoek, Wilmington, DE (US); Hartmut Krause, Wermelskirchen (DE); Matthew T Reed, La Porte, IN (US)

(73) Assignee: Axalta Coating Systems IP Co., LLC, Wilmington, DE (US)

( * ) Notice: Subject to any disclaimer, the term of this patent is extended or adjusted under 35 U.S.C. 154(b) by 161 days.

This patent is subject to a terminal disclaimer.

(21) Appl. No.: 13/700,504

(22) PCT Filed: Jun. 24, 2011

(86) PCT No.: PCT/US2011/041812
§ 371 (c)(1), (2), (4) Date: Nov. 28, 2012

(87) PCT Pub. No.: WO2011/163583
PCT Pub. Date: Dec. 29, 2011

(65) Prior Publication Data
US 2013/0071015 A1    Mar. 21, 2013

Related U.S. Application Data

(60) Provisional application No. 61/358,555, filed on Jun. 25, 2010.

(51) Int. Cl.
G06K 9/00    (2006.01)
G06T 7/00    (2006.01)
B05D 5/00    (2006.01)

(52) U.S. Cl.
CPC . *G06T 7/00* (2013.01); *B05D 5/005* (2013.01); *B05D 2202/00* (2013.01)

USPC .......................................................... 382/162

(58) Field of Classification Search
CPC .... G06F 17/30274; G06T 11/001; G01J 3/02; G01J 3/0264; G01J 3/504; G01J 3/46; G01J 3/463; B05D 3/12; B05D 5/005; B05D 5/06; B05D 7/14; B05D 7/57
See application file for complete search history.

(56) References Cited

U.S. PATENT DOCUMENTS 6,187,375 B1    2/2001  Alders et al.
6,701,601 B2 *  3/2004  Davidson et al. ............... 29/458

(Continued)

FOREIGN PATENT DOCUMENTS

CN    101617205 A    12/2009

OTHER PUBLICATIONS

ISA USPTO, International Search Report and Written Opinion for International Application No. PCT/US2011/041812, mailed Nov. 16, 2011.

(Continued)

*Primary Examiner* — Jose Couso
(74) *Attorney, Agent, or Firm* — Ingrassia Fisher & Lorenz, P.C.

(57) ABSTRACT

The present invention is directed to a system for repairing one or more defects of a target coating of a vehicle. The system can repair target coatings at a repair facility using matching coating compositions provided from a supply center, where the matching coating compositions can be produced according to target repair data transmitted from one or more repair facilities to the supply center. The system can comprise one or more supply centers and one or more repair facilities.

25 Claims, 4 Drawing Sheets

(56) References Cited

U.S. PATENT DOCUMENTS

| | | | |
|---|---|---|---|
| 6,714,831 B2 * | 3/2004 | Matthews et al. | 700/110 |
| 6,914,613 B2 * | 7/2005 | Marchand et al. | 345/593 |
| 7,145,656 B2 * | 12/2006 | Rodrigues et al. | 356/402 |
| 7,194,361 B2 * | 3/2007 | Corrigan et al. | 702/32 |
| 7,223,138 B2 * | 5/2007 | Fuse | 440/38 |
| 7,337,162 B2 * | 2/2008 | Lewis | 1/1 |
| 7,743,055 B2 * | 6/2010 | Rodrigues et al. | 707/722 |
| 7,747,615 B2 | 6/2010 | Rodrigues et al. | |
| 2003/0139836 A1 | 7/2003 | Matthews et al. | |
| 2003/0163262 A1 | 8/2003 | Corrigan et al. | |
| 2004/0093112 A1 | 5/2004 | Marchand et al. | |
| 2005/0128484 A1 | 6/2005 | Rodrigues et al. | |

OTHER PUBLICATIONS

ISA USPTO, International Preliminary Report on Patentability for International Application No. PCT/US2011/041812, mailed Jan. 10, 2013.

SIPO, P. R. China, First Office Action issued in Chinese Application No. 201180041149, issued Dec. 12, 2013.

SIPO, P. R. China, Second Office Action issued in Chinese Application No. 201180041149, issued Jun. 16, 2014.

* cited by examiner

US 8,929,646 B2

SYSTEM FOR PRODUCING AND DELIVERING MATCHING COLOR COATING AND USE THEREOF

CROSS-REFERENCE TO RELATED APPLICATION

This application is a U.S. National-Stage entry under 35 U.S.C. 371 based on International Application No. PCT/US2011/041812, filed Jun. 24, 2011 which was published under PCT Article 21(2) and which claims priority to U.S. Application No. 61/358,555, filed Jun. 25, 2010, which are all hereby incorporated in their entirety by reference.

FIELD OF INVENTION

The present invention is directed to a system for repairing one or more defects of a target coating of a vehicle. The system can comprise one or more supply centers and one or more repair facilities.

BACKGROUND OF INVENTION

Surface coatings such as monocoat, clearcoat/colorcoat, and tricoat are favored for the protection and decoration of substrates such as vehicle bodies. The surface coatings can utilize one or more pigments or effect pigments to impart the desired color or appearance, such as solid, metallic, pearlescent effect, gloss, or distinctness of image, to the vehicle bodies. Metallic flakes, such as aluminum flakes are commonly used to produce coatings having flake appearances such as texture, sparkle, glint, coarseness and glitter as well as the enhancement of depth perception in the coatings imparted by the flakes.

Repair of such coatings that have been damaged, e.g., in a collision or stone chipping or scratches, has been difficult in that a vehicle repair body shop or a refinisher may have to go to great lengths to repeatedly try out and to locate a best aftermarket refinish coating composition that matches the color and appearance of the vehicle's original coating, also known as original equipment manufacturing (OEM) coating. While each coating composition used in a vehicle's OEM coating is manufactured to a given color standard, so that, in theory, all vehicles painted with a given coating composition should appear the same color and appearance, due to a host of different variables, such as changing atmospheric conditions and use of different application techniques, the appearance of a given coating composition may actually vary from plant to plant and over different times of any given year. Consequently, vehicles manufactured at one plant may appear a different color than vehicles painted with the same coating composition at another plant. In addition, a vehicle's OEM coating may also change color or appearance due to environmental exposure and time. A number of refinish matching coating compositions must therefore be developed for each OEM coating composition. Presently there is no quick, easy and inexpensive way to determine which aftermarket matching refinish coating composition is the best match in color and appearance for a particular OEM coating.

Various color matching techniques have been developed in the past to aid the selection of the correct matching coating composition to refinish a vehicle, but all have certain significant limitations.

STATEMENT OF INVENTION

This invention is directed to a system for repairing one or more defects of a target coating of a vehicle, said system comprising:

A) a supply center (10) comprising at least one central computing device for producing a matching formula, a plurality of coating components, at least one dispensing device and at least one mixing device for dispensing and mixing coating components based on the matching formula to produce a matching coating composition; and B) at least one repair facility (11) comprising at least one terminal computing device in communication with said central computing device, at least one color measuring device for obtaining color characteristics of the target coating, at least one data input device for obtaining and inputting vehicle identification data and a paint code of said vehicle into said terminal computing device, at least one terminal display device, at least one coating application device, and optionally at least one appearance measuring device;

wherein:

said terminal computing device comprises a computing program product that when installed on said terminal computing device causes said terminal computing device to perform a terminal computing process comprising the steps of:

T1) receiving said vehicle identification data and said paint code of said vehicle, said color characteristics and said appearance characteristics of said target coating;

T2) receiving size data of the defects and producing paint quantity data based on said size data; and T3) transmitting target repair data comprising said vehicle identification data and said paint code of said vehicle, said paint quantity data, said color characteristics and said appearance characteristics of said target coating to said central computing device; and said central computing device comprises a computing program product that when installed on said central computing device causes said central computing device to perform a central computing process comprising the steps of:

C1) receiving said target repair data from said terminal computing device;

C2) producing one or more preliminary matching formulas according to said target repair data;

C3) receiving a selection input for selecting said matching formula from said one or more preliminary matching formulas; and C4) outputting said matching formula to an output device.

This invention is directed to a system for repairing one or more defects of a target coating of a vehicle, said system comprising:

A) a supply center (10) comprising at least one central computing device for producing a matching formula, a plurality of coating components, at least one dispensing device and at least one mixing device for dispensing and mixing coating components based on the matching formula to produce a matching coating composition; and B) at least one repair facility (11) comprising at least one terminal computing device in communication with said central computing device, at least one color measuring device for obtaining color characteristics of the target coating, at least one data input device for obtaining and inputting vehicle identification data and a paint code of said vehicle into said terminal computing device, at least one terminal display device, and at least one coating application device;

wherein:

said terminal computing device comprises a computing program product that when installed on said terminal computing device causes said terminal computing device to perform a terminal computing process comprising the steps of:

T1) receiving said vehicle identification data and said paint code of said vehicle and said color characteristics of the target coating;

T2) receiving size data of the defects and producing paint quantity data based on said size data; and T3) transmitting target repair data comprising said vehicle identification data and said paint code of said vehicle, said color characteristics of the target coating, and said paint quantity data, to said central computing device; and said central computing device comprises a computing program product that when installed on said central computing device causes said central computing device to perform a central computing process comprising the steps of:

C1) receiving said target repair data from said terminal computing device;

C2) producing one or more preliminary matching formulas according to said target repair data;

C3) generating individual matching images having matching image R,G,B values based on color characteristics interrelated to each of the preliminary matching formulas;

C4) displaying the individual matching images having said matching image R,G,B values on a supply center display device;

C5) generating a target image having target R,G,B values based on the color characteristics of the target coating;

C6) displaying the target images having said target R,G,B values on said supply center display device;

C7) receiving a selection input for selecting said matching formula from said one or more preliminary matching formulas; and C8) outputting said matching formula to an output device.

DETAILED DESCRIPTION

Figure 1:
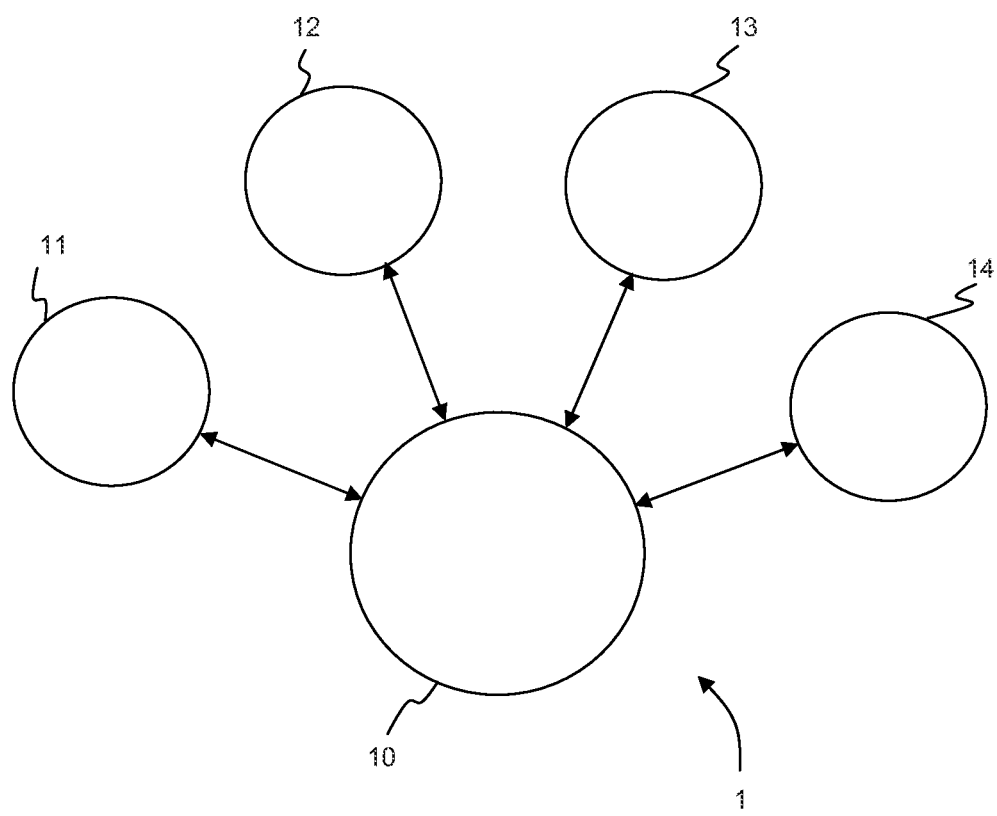
FIG. 1 shows an example of a schematic representation of the system having one supply center (10) and a number of repair facilities (11-14) for repairing one or more defects of a target coating of a vehicle.

The features and advantages of the present invention will be more readily understood, by those of ordinary skill in the art, from reading the following detailed description. It is to be appreciated that certain features of the invention, which are, for clarity, described above and below in the context of separate embodiments, may also be provided in combination in a single embodiment. Conversely, various features of the invention that are, for brevity, described in the context of a single embodiment, may also be provided separately or in any sub-combination. In addition, references in the singular may also include the plural (for example, "a" and "an" may refer to one, or one or more) unless the context specifically states otherwise.

The use of numerical values in the various ranges specified in this application, unless expressly indicated otherwise, are stated as approximations as though the minimum and maximum values within the stated ranges were both proceeded by the word "about." In this manner, slight variations above and below the stated ranges can be used to achieve substantially the same results as values within the ranges. Also, the disclosure of these ranges is intended as a continuous range including every value between the minimum and maximum values.

As used herein:

The term "pigment" or "pigments" used herein refers to a colorant or colorants that produce color or colors. A pigment can be from natural and synthetic sources and made of organic or inorganic constituents. A pigment can also include metallic particles or flakes with specific or mixed shapes and dimensions. A pigment can also be used as a flop control agent. A pigment is usually not soluble in a coating composition.

The term "effect pigment" or "effect pigments" refers to pigments that produce special effects in a coating. Examples of effect pigments can include, but not limited to, light scattering pigments, light interference pigments, and light reflecting pigments. Flakes, such as metallic flakes, for example aluminum flakes, can be examples of such effect pigments.

Gonioapparent flakes refer to flakes which change color or appearance, or a combination thereof, with change in illumination angle or viewing angle. Metallic flakes, such as aluminum flakes are examples of gonioapparent flakes.

The term "dye" means a colorant or colorants that produce color or colors. Dye is usually soluble in a coating composition.

"Appearance" used herein refers to (1) the aspect of visual experience by which a coating is viewed or recognized; and (2) perception in which the spectral and geometric aspects of a coating is integrated with its illuminating and viewing environment. In general, appearance can include gloss, mattness, surface texture, sparkle, flake appearances such as texture, sparkle, glint, coarseness, the enhancement of depth perception in the coatings imparted by the flakes, or other visual effects of a coating mentioned herein or known to those skilled in the art. The appearance can also include distinctness of image (DOI). The appearance can also include any other visual effects of a coating especially when viewed from varying viewing angles and/or with varying illumination angles.

The term "database" refers to a collection of related information that can be searched and retrieved. The database can be a searchable electronic numerical, alphanumerical or textual document; a searchable PDF document; a Microsoft Excel® spreadsheet; a Microsoft Access® database (both supplied by Microsoft Corporation of Redmond, Wash.); an Oracle® database (supplied by Oracle Corporation of Redwood Shores, Calif.); or a Linux database, each registered under their respective trademarks. The database can be a set of electronic documents, photographs, images, diagrams, or drawings, residing in a computer readable storage media that can be searched and retrieved. A database can be a single database or a set of related databases or a group of unrelated databases. "Related database" means that there is at least one common information element in the related databases that can be used to relate such databases. One example of the related databases can be Oracle® relational databases.

The term "vehicle", "automotive", "automobile", "automotive vehicle", or "automobile vehicle" refers to an automobile such as car, van, mini van, bus, SUV (sports utility vehicle); truck; semi truck; tractor; motorcycle; trailer; ATV (all terrain vehicle); pickup truck; heavy duty mover, such as, bulldozer, mobile crane and earth mover; airplanes; boats; ships; and other modes of transport that are coated with coating compositions.

A computing device used herein refers to a desktop computer, a laptop computer, a pocket PC, a personal digital assistant (PDA), a handheld electronic processing device, a smart phone that combines the functionality of a PDA and a mobile phone, an iPod, an iPod/MP Player, or any other electronic devices that can process information automatically. A computing device can have a wired or wireless connection to a database or to another computing device. A computing device can be a client computer that communicates with a host computer in a multi-computer client-host system connected via a wired or wireless network including intranet and internet. A computing device can also be configured to be coupled with a data input or output device via wired or wireless connections. For example, a laptop computer can be operatively configured to receive color data and images through a wireless connection. A computing device may further be a subunit of another device. Examples of such a subunit can be a processing chip in an imaging device, a spectrophotometer, or a goniospectrophotometer. A computing device may be connected to a display device, such as a monitor screen. A "portable computing device" includes a laptop computer, a pocket PC, a personal digital assistant (PDA), a handheld electronic processing device, a mobile phone, a smart phone that combines the functionality of a PDA and a mobile phone, a tablet computer, an iPod, an iPad, an iPod/MP Player, or any other stand alone or subunit devices that can process information and data and can be carried by a person.

Wired connections can include hardware couplings, splitters, connectors, cables or wires. Wireless connections and devices can include, but not limited to, Wi-Fi device, Bluetooth device, wide area network (WAN) wireless device, Wi-Max device, local area network (LAN) device, 3G or 4G broadband device, infrared communication device, optical data transfer device, radio transmitter and optionally receiver, wireless phone, wireless phone adaptor card, or any other devices that can transmit signals in a wide range of electromagnetic wavelengths including radio frequency, microwave frequency, visible or invisible wavelengths.

An imaging device refers to a device that can capture images under a wide range of electromagnetic wavelengths including visible or invisible wavelengths. Examples of the imaging device include, but not limited to, a still film optical camera, a digital camera, an X-Ray camera, an infrared camera, an analog video camera, and a digital video camera. A digital imager or digital imaging device refers to an imaging device captures images in digital signals. Examples of the digital imager include, but not limited to, a digital still camera, a digital video camera, a digital scanner, and a charge coupled device (CCD) camera. An imaging device can capture images in black and white, gray scale, or various color levels. A digital imager is preferred in this invention. Images captured using a non-digital imaging device, such as a still photograph, can be converted into digital images using a digital scanner and can also be suitable for this invention. The imaging device can further comprise an illumination device that provides illumination at a single or multiple angles.

A display device can be a computer monitor, a projector, a TV screen, a personal digital assistant (PDA) device, a cell phone, a smart phone that combines PDA and cell phone, an iPod, an iPad, an iPod/MP Player, a flexible thin display, or any other devices that can display information or images based on digital signals. The display device can also be a printing device that prints, based on digital signals, information or image onto papers, plastics, textiles, or any other surfaces that are suitable for printing the information or images onto. The display device can also be a duel functional display/data input device, such as a touch screen.

An output device can include, but not limited to, a computer monitor, a projector, a TV screen, a personal digital assistant (PDA) device, a cell phone, a smart phone that combines PDA and cell phone, an iPod, an iPad, an iPod/MP Player, a flexible thin digital display, or any other devices that can display or output information or images based on digital signals. The output device can also be a printing device that prints, based on digital signals, information or image onto papers, plastics, textiles, or any other surfaces that are suitable for printing the information or images onto. The output device can also be a duel functional display/data input device, such as a touch screen. The output device can also be a conventional paper or plotting paper. The output device can also be a computing device, such as a desktop, a laptop computer, or a PDA; a data storage device, such as a hard drive, an compact disk (CD), a DVD, a memory device such as a USB flash card, or any other types of digital data storage devices; or a memory device, such as a computer RAM.

The term "matching formula", "repair formula" or "formula" refers to a collection of information or instruction, based upon that, a repair composition, such as a repair coating composition or a matching coating composition can be prepared. A refinish matching coating formula can be a typical example of the repair formula. A repair formula can also be a formula to repair small damage of a vehicle coating at some points of original manufacturing (OEM) production line wherein a refinish formula has not yet been developed for that particular vehicle.

This disclosure is directed to a system for repairing one or more defects of a target coating of a vehicle. The system (1) can comprise a supply center (10) and one or more repair facilities (11)-(14) (FIG. 1).

Figure 2:
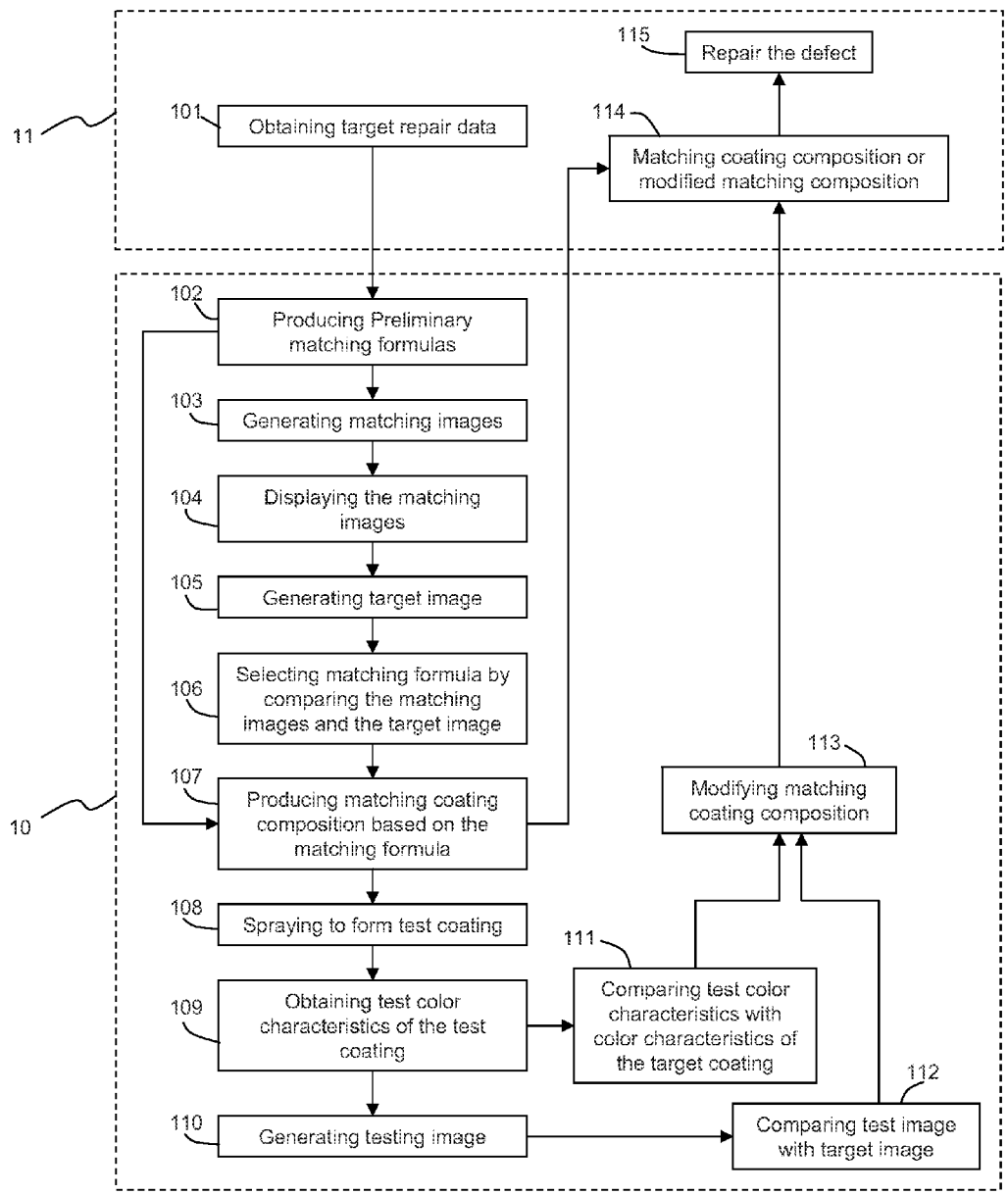
FIG. 2 shows an example of a schematic representation of the process for repairing one or more defects of a target coating of a vehicle.
Figure 3:
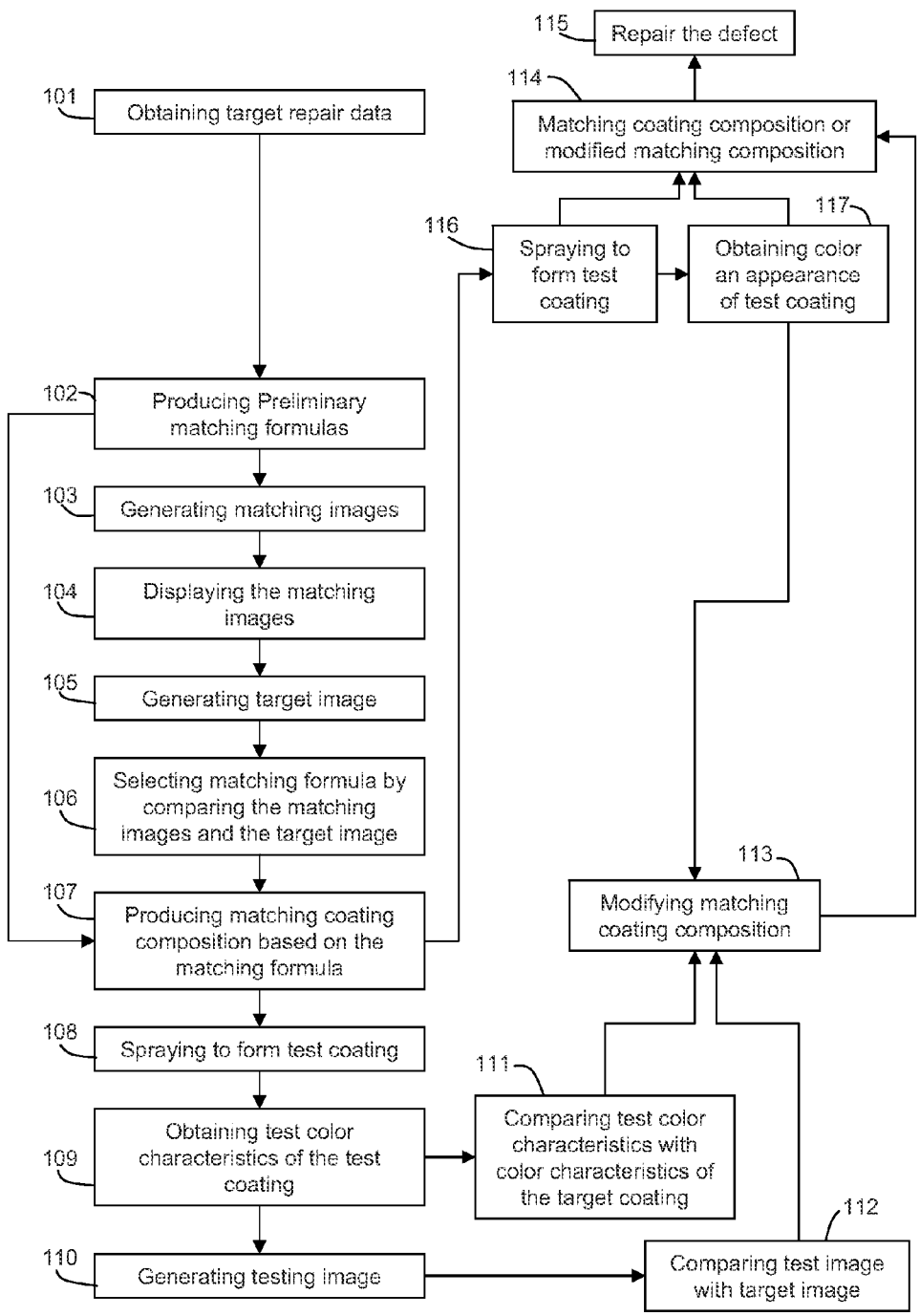
FIG. 3 shows another example of a schematic representation of the process for repairing one or more defects of a target coating of a vehicle.

This disclosure is also directed to a process for repairing one or more defects of a target coating of a vehicle. Examples of schematic representations of the process can be shown in FIG. 2 (101)-(115) and FIG. 3 (101)-(117).

The process can comprise the steps of:

a) obtaining at a repair facility target repair data comprising vehicle identification data and a paint code of said vehicle, paint quantity data, and color characteristics of the target coating (101);

b) transmitting said target repair data from said repair facility to a supply center;

c) producing one or more preliminary matching formulas according to said target repair data (102);

d) selecting a matching formula from the one or more preliminary matching formulas at said supply center by a selection process comprising:

d1) generating individual matching images having matching image R,G,B values based on color characteristics interrelated to each of the preliminary matching formulas (103);

d2) displaying the individual matching images having said matching image R,G,B values on a supply center display device (104);

d3) generating a target image having target R,G,B values based on the color characteristics of the target coating (105);

d4) displaying the target image having said target R,G,B values on said supply center display device; and d5) selecting said matching formula by comparing the individual matching images and the target image displayed on said supply center display device (106); and e) producing a matching coating composition at the supply center by mixing coating components according to the matching formula (107, 114).

The process can also comprise the steps of:

a) obtaining at a repair facility target repair data comprising vehicle identification data and a paint code of said vehicle, paint quantity data, color characteristics of the target coating, and appearance characteristics of the target coating;

b) transmitting said target repair data from said repair facility to a supply center;

c) producing one or more preliminary matching formulas according to said target repair data;

d) selecting a matching formula from the one or more preliminary matching formulas at said supply center by a selection process comprising:

d1) generating individual matching images having matching image R,G,B values based on color characteristics and appearance characteristics interrelated to each of the preliminary matching formulas;

d2) displaying the individual matching images having said matching image R,G,B values on a supply center display device;

d3) generating a target image having target R,G,B values based on the color characteristics and appearance characteristics of the target coating;

d4) displaying the target image having said target R,G,B values on said supply center display device; and d5) selecting said matching formula by comparing the individual matching images and the target image displayed on said supply center display device; and e) producing a matching coating composition at the supply center by mixing coating components according to the matching formula.

The vehicle identification data can comprise vehicle data selected from vehicle make, vehicle model name, vehicle model year, vehicle manufacturing site, vehicle manufacturing year, vehicle manufacturing sequential number, a vehicle identification number (VIN), part of a VIN, or a combination thereof. The vehicle identification data can be obtained from vehicle identification label, an optical vehicle data source, an electromagnetic vehicle data source of said vehicle, or a combination thereof. For example, the VIN of the vehicle can be entered into a computer manually, scanned using a scanner in combination with well known optical character recognition (OCR) software, or read by other electronic devices. Detailed descriptions of US vehicle identification number (VIN) is provided in Federal Register, Rules and Regulations, Vol. 16, No. 111, pages 29031-29036, published on Jun. 7, 1996. The electromagnetic vehicle data source can store the vehicle identification data and can be a passive data storage device such as a memory chip, a disk, or a RFID (radio frequency identification) chip; or an active radio transponder that can transmit vehicle identification data via a broad range of radio frequency and the data can be received by a corresponding receiver.

The paint code is typically provided by the vehicle manufacturer and can be available from the vehicle, vehicle's operation manual or directly from the manufacturer of the vehicle.

The paint quantity data can be produced based on size data related to the size of the defects of the target coating. Computer program products can be used for producing the paint quantity data based on the size data or the size data in combination of matching formulas, color and/or appearance characteristics. The commercial paint volume calculator available from DuPont™ Colornet®, under trademark or registered trademark of E.I. duPont de Nemours and Company, can be suitable. Other commercial tools, such as Standox Univers™, Spies Hecker Wizard™, under trademarks of E.I. duPont de Nemours and Company, can also be used.

Color characteristics can comprise L,a,b values, L*,a*,b* values, X,Y,Z values, L,C,h values, spectral reflectance data, modified spectral reflectance data, or a combination thereof. The color characteristics can be obtained by using a colorimeter, a spectrophotometer, or a goniospectrophotometer. The modified spectral reflectance data can be obtained by modifying the spectral reflectance data. Examples of the modified spectral reflectance data can include those data normalized to correct device or measurement variations so spectral reflectance data obtained from different devices or instruments can be compared. The color characteristics of the target coating can be obtained by measuring the target coating using a color measuring device. Examples of color measuring device can include colorimeter, a spectrophotometer, or a goniospectrophotometer. Other color measuring devices can also be used. The color characteristics of the target coating can also be obtained by visually comparing the target coating with a set of color reference standards. A color reference standard database can be used to associate each of the color reference standards to color characteristics, one or more color formulas, or a combination thereof. Examples of color reference standards can include color chips.

Appearance characteristics can include, but not limited to, texture, metallic, pearlescent effect, gloss, distinctness of image, flake appearances such as texture, sparkle, glint, coarseness and glitter as well as the enhancement of depth perception in the coatings imparted by the flakes, especially produced by metallic flakes, such as aluminum flakes.

Color and appearance characteristics can contain data related to one or more illumination angels, one or more view angles, or a combination thereof.

The target repair data can be transmitted from a repair facility to the supply center via any of the aforementioned wired or wireless connections or a combination thereof. The target repair data can be transmitted from a terminal computing device at the repair facility to a central computing device at the supply center. The target repair data can be transmitted from the terminal computing device at the repair facility to one or more third computing devices or one or more data storage devices that can be accessible from the central computing device at the supply center.

Figure 4:
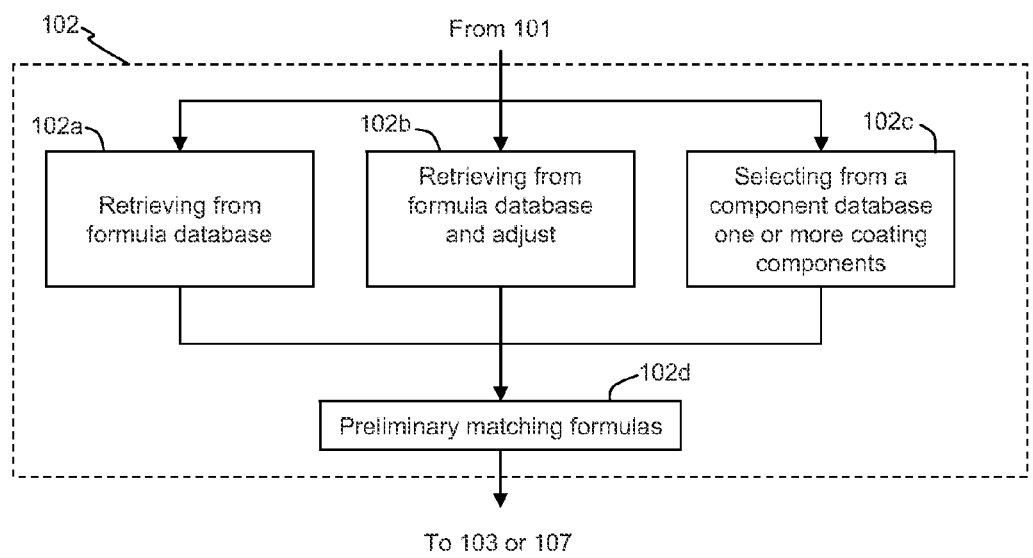
FIG. 4 shows examples of a schematic representation of the process for producing preliminary matching formulas.

The one or more preliminary matching formulas can be produced by retrieving one or more stored formulas at the supply center from a formula database according to the vehicle identification data and the paint code of said vehicle, the color characteristics and/or appearance characteristics of the target coating (102a) (FIG. 4). The formula database can comprise interrelated repair formulas, vehicle identification data of vehicles, paint codes of vehicles, and color characteristics. The one or more preliminary matching formulas can also be produced by retrieving one or more stored formulas at said supply center from a formula database according to said vehicle identification data and said paint code of said vehicle, said color characteristics and appearance characteristics of the target coating, said formula database comprising interrelated repair formulas, vehicle identification data of vehicles, paint codes of vehicles, color characteristics and appearance characteristics.

Although the vehicle identification data, the paint code of the vehicle, and the color characteristics or appearance characteristics of the target coating can be used for retrieving preliminary matching formulas, each can have different weighing factors in the retrieving process. In one example, the one or more preliminary matching formulas can be retrieved mainly according to part of the vehicle identification number (VIN) and the paint code of the vehicle. If a plurality of formulas (also known as "hits") is retrieved, color characteristics of the target coating can be used to further narrow down the hits. In another example, the one or more preliminary matching formulas can be retrieved mainly according to color characteristics of the target coating. In yet another example, the one or more preliminary matching formulas can be retrieved according to VIN, color code and color characteristics of the target coating. In yet another example, the one or more preliminary matching formulas can be retrieved according to the VIN or a part of the VIN, the color code, and the color and appearance characteristics of the target coating.

The one or more preliminary matching formulas can also be produced (102b) (FIG. 4) by retrieving one or more stored formulas at said supply center from a formula database according to said vehicle identification data and said paint code of said vehicle and said color characteristics of the target coating, said formula database comprising interrelated repair formulas, vehicle identification data of vehicles, paint codes of vehicles, and color characteristics, and adjusting the stored formulas retrieved from said formula database according to the color characteristics of the target coating and color characteristics associated with each of the stored formulas using an adjusting process selected from: a linear shading process, a non-linear shading process, a vector shading process, an artificial intelligence (AI) modeling process, a neural networks (NN) modeling process, or a combination thereof. The one or more preliminary matching formulas can also be produced by retrieving one or more stored formulas at said supply center from a formula database according to said vehicle identification data and said paint code of said vehicle, said color characteristics and appearance characteristics of the target coating, said formula database comprising interrelated repair formulas, vehicle identification data of vehicles, paint codes of vehicles, color characteristics and appearance characteristics, and adjusting the stored formulas retrieved from said formula database according to the color characteristics and appearance characteristics of the target coating and color characteristics and appearance characteristics associated with each of the stored formulas using an adjusting process selected from: a linear shading process, a non-linear shading process, a vector shading process, an artificial intelligence (AI) modeling process, a neural networks (NN) modeling process, or a combination thereof.

A shading database can be used in the process of this disclosure. The shading database can comprise measured data or predicted data for adjusting coating compositions. The coating compositions can be adjusted for color, viscosity, hiding power, sagging, gloss, and other properties to achieve color and appearance match. Depending on pigments or tints required in a matching formula, non-color components, such as binder components and additive components can also be adjusted to provide the matching coating composition having desired properties and color and appearance match.

The retrieved stored formulas can be compared to the color characteristics, or additionally appearance characteristics, of the target coating, and each can be assigned an evaluation value based on the comparison. In one example, the evaluation value can range from 1 to 10 with 10 being the best match and can be generated by comparing the color characteristics of the target coating with the color characteristics associated with the retrieved stored formula. In another example, the evaluation value can be assessed visually by comparing the matching images and the target image displayed on the display device.

The one or more preliminary matching formulas can also be produced (102c) (FIG. 4) by selecting from a component database one or more coating components, ratios of the one or more coating components, or a combination thereof, according to said color characteristics of the target coating and color characteristics interrelated with each of the one or more coating components. The component database can comprise coating components each interrelated with color characteristics. The one or more preliminary matching formulas can also be produced by selecting from a component database one or more coating components, ratios of the one or more coating components, or a combination thereof, according to said color and appearance characteristics of the target coating and color and appearance characteristics interrelated with each of said one or more coating components, said component database comprises coating components each interrelated with color characteristics, appearance characteristics, or a combination thereof.

Examples of coating components can include color components, such as tints, dyes, pigments; appearance components, such as flop control pigments, effect pigments like metallic flakes, pearlescent pigments, etc; binder components, and additive components. The coating components can further comprise solvent components. The color components can be formulated together with the binder components, and/or the additive components. Color and appearance characteristics for the component database can comprise any of the aforementioned color and appearance characteristics, absorption and scattering coefficients (K, S), flake coefficients or a combination thereof. Color and appearance characteristics for the component database can further comprise color data, appearance data, or a combined color and appearance data generated from coating prediction models, such as artificial intelligence (AI) models, neural networks (NN) models, or a combination thereof. The color and appearance characteristics can be associated to each of the coating components. Each of the coating components can have component identification (ID). The selection of the coating components can be done by selecting the component ID associated to the coating component.

The appearance characteristics of the target coating can be obtained by a process comprising the steps of:
  i) obtaining one or more appearance images of the target coating; and
  ii) generating said appearance characteristics of the target coating from the appearance images.

The appearance images can be obtained by using any of the aforementioned imaging devices.

The appearance characteristics of the target coating can also be obtained by measuring appearance properties of the target coating, said appearance properties are selected from coating gloss, distinctness of image (DOI), matt, sparkle, coarseness, sagging, or a combination thereof.

The appearance characteristics of the target coating can also be derived from the vehicle identification number (VIN) or part of the VIN of the vehicle, a set of appearance reference standards, or a combination thereof. A database can be established comprising appearance characteristics associated with the VINs, part of the VINs, vehicle data associated with VINs such as assembly plant, production sequence numbers, model year, or a combination thereof. Then, the VIN or part of the VIN can be parsed to provide appearance characteristics of vehicles that are associated with the VIN or part of the VIN. The set of appearance reference standards can be a set of coating chips with varying appearance characteristics. The appearance characteristics of the target coating can be obtained by visually comparing the target coating and the appearance reference standards. An appearance reference standard database can be used to associate each of the appearance reference standards to a set of appearance characteristics, one or more appearance formulas, or a combination thereof. The appearance characteristics can be used further in the process. Examples of the appearance reference standards can include coarseness standard chips that can have a number of coating chips having coatings with different coarseness. The appearance reference standards can be in mono-color or full color.

The process of this disclosure can further comprise the step of repairing said defects using said matching coating composition at said repair facility (115).

The process of this disclosure can further comprise the steps of:
 f) modifying the matching coating composition by a modification process comprising the steps of:
  f1) applying a portion of the matching coating composition over at least one test substrate to form at least one test coating; and
  f2) obtaining test coating data comprising test color characteristics of said test coating.

The modification process can further comprise the step of:
 f3) adjusting said matching coating composition to form a modified matching coating composition (113) by comparing said test coating data with said color characteristics of the target coating.

The test coating data can further comprise test appearance characteristics of the test coating and the modification process can further comprise the step of:
 f3a) adjusting said matching coating composition to form a modified matching coating composition by comparing said test coating data with said color characteristics and appearance characteristics of the target coating.

The test coating can be formed and data obtained either at the repair facility (116 and 117) or at the supply center (108, 109 and 111), or both using a coating application device. Examples of coating application device can include: a spray gun, r roller, a brush, a dipper, a soaking tank, or any other devices that can apply a coating composition to a substrate. In one example, a test coating can be formed at the supply center and test coating data can be obtained at the supply center. In another example, a test coating can be form at a repair facility and test coating data can be obtained at the repair facility and transmitted to the supply center. In yet another example, a first test coating can be formed at the supply center and a second test coating can be formed at a repair facility. Test coating data can be obtained at both the repair facility and the supply center. The matching coating composition can be modified at the supply center according the test coating data and the color and appearance characteristics of the target coating.

The modification process can further comprise the steps of:
 f4) generating a testing image having testing R,G,B values based on said test color characteristics (110);
 f5) displaying said testing image having said testing R,G,B values on said supply center display device; and
 f6) adjusting said matching coating composition to form a modified matching coating composition by comparing said testing image with said target image displayed on said supply center display device (112 and 113).

The test coating data can further comprise test appearance characteristics of the test coating and the modification process can further comprise the steps of:
 f4a) generating a testing image having testing R,G,B values based on said test color characteristics and said test appearance characteristics (110);
 f5a) displaying said testing image having said testing R,G,B values on said supply center display device; and
 f6a) adjusting said matching coating composition to form a modified matching coating composition by comparing said testing image with said target image displayed on said supply center display device (112 and 113).

Each of the individual matching images can be displayed as a realistic matching image. The target image can be displayed as a realistic target image. Typically, when the target image is displayed as a realistic image, the matching images can also be displayed as realistic images. The individual matching image and the target image can also be displayed as a simulated blending image. Methods for displaying realistic images and simulated blending image are described in U.S. Pat. No. 7,743,055.

The matching coating composition can be produced by a mixing process comprising the steps of:
 m1) generating paint mixing data according to said matching formula and a target paint quantity data;
 m2) dispensing said coating components into a mixing device according to said paint mixing data; and
 m3) mixing the dispensed coating components in said mixing device.

The paint mixing data can comprise quantity data in any one of the forms selected from: weights in grams or pounds, volumes in any volume unites, single weight scale, running total weight (either running-up or running-down), or any other forms known to those skilled in the art. An operator can choose any of the forms based on equipments available or preference and can convert any of the forms from one to another. Typically, the matching formula can comprise relative quantity data such as weight percentage, volume percentage or parts percentage. Such relative quantity data can be converted to the paint mixing data so a matching coating composition can be mixed accordingly. Weight percentage and volume percentage can be converted to each other for a particular coating composition. Weight percentages can also be converted to measurable weight units such as a running total weight in grams or pounds. Volume percentages can be converted to measurable volume units. Different weight or volume units can also be converted to each other. In one example, a running total weight paint mixing data can be generated so a scale can be used to weigh the coating components sequentially without the need to reset the scale. In another example, a single weight paint mixing data can be generated for each of the coating components and a scale can be reset to zero after each coating component is weighed. In yet another example, a running total volume paint mixing data can be generated so individual coating components can be dispensed into a volume measuring device sequentially without the need to change volume measuring device. In yet another example, single volume paint mixing data can be generated so individual coating components can be measured individually and dispensed into a mixing device.

The target paint quantity data can be produced according to the aforementioned paint quantity data. The target paint quantity can be the same or different from the paint quantity data. In one example, the paint quantity data can be for 100% coverage of a repair area, while the target paint quantity data can be generated to cover 150% of the repair area allowing for some testing and adjusting. In another example, the target paint quantity data can be generated to be at about 10% of the paint quantity data for initial testing of color and appearance match. After a match is confirmed, a new target quantity data can be generated for producing the matching coating composition in a desired quantity. The target paint quantity data can also be generated to track the paint quantity change after a portion of it has been used in spray testing.

The matching coating composition can be produced by manual dispensing or automatic dispensing. For manual dispensing, coating components according to the paint mixing data can be weighed by weight or measured by volume and dispensed into the mixing device. For automatic dispensing, the process can further comprise the step of transmitting the paint mixing data to a dispensing device before the step m2).

The coating components can be dispensed automatically by the dispensing device according to said paint mixing data. The process can further comprise the step of obtaining inventory data of the coating components. The process can further comprise the step of resupply said coating components at said supply center according to said inventory data. Dispensing devices and processes described in U.S. Pat. Nos. 7,264,160 and 7,264,161 can be suitable.

The process can further comprise the steps of obtaining feedback data and storing said feedback data in a feedback database. The feedback database can be accessible via wired or wireless connections from one or more authorized computing devices, the central computing device, the terminal computing device, or a combination thereof. An authorized computing device can be a laptop, a PDA, a smart phone that can log into the database using any known authentication process, such as login ID and password. An authorized computing device can access the database from anywhere via wired or wireless connections, such as internet, Wi-Fi, or cell phone networks. Any of the aforementioned wired or wireless connections can be suitable. The feedback data can be shared among the one or more repair facilities, the supply centers, one or more customers, and any other authorized parties. An authorization and authentication process can be configured. Feedback data can comprise blogs, e-mails, text messaging, online chatting, assay documents, online form submission, or a combination thereof. In one example, feedback data can be submitted via online blog and stored in an online database. In another example, feedback data can be obtained from the terminal computing device at one or more of the repair facilities. In yet another example feedback data can be obtained form a customer via cell phone text messaging. In yet another example, feedback data can be obtained and accessed from a website. In yet another example, feedback data on quality of the matching formulas can be stored in the formula database, the component database, or a combination thereof.

The process of this disclosure can further comprise the step of transmitting said matching images, and optionally the target image, to the repair facility.

The process of this disclosure can also comprise the steps of:
 a) obtaining at a repair facility target repair data comprising vehicle identification data and a paint code of said vehicle, paint quantity data, and color characteristics of the target coating;
 b) transmitting said target repair data from said repair facility to a supply center;
 c) producing one or more preliminary matching formulas according to said target repair data;
 d) selecting a matching formula from the one or more preliminary matching formulas at said supply center according to said color characteristics of the target coating; and
 e) producing a matching coating composition at the supply center by mixing coating components according to the matching formula.

The target repair data can further comprises appearance characteristics of the target coating and the one or more preliminary matching formulas can be produced according to said target repair data. The matching formula can be selected from the one or more preliminary matching formulas at the supply center according to the color characteristics of the target coating and the appearance characteristics of the target coating.

This disclosure is also directed to a system for repairing one or more defects of a target coating of a vehicle. The system can comprise:

A) a supply center (10) comprising at least one central computing device for producing a matching formula, a plurality of coating components, at least one dispensing device and at least one mixing device for dispensing and mixing coating components based on the matching formula to produce a matching coating composition; and B) at least one repair facility (11) comprising at least one terminal computing device in communication with said central computing device, at least one color measuring device for obtaining color characteristics of the target coating, at least one data input device for obtaining and inputting vehicle identification data and a paint code of said vehicle into said terminal computing device, at least one terminal display device, and at least one coating application device;

wherein:

said terminal computing device comprises a computing program product that when installed on said terminal computing device causes said terminal computing device to perform a terminal computing process comprising the steps of:
 T1) receiving said vehicle identification data and said paint code of said vehicle and said color characteristics of the target coating;
 T2) receiving size data of the defects and producing paint quantity data based on said size data; and
 T3) transmitting target repair data comprising said vehicle identification data and said paint code of said vehicle, said color characteristics of the target coating, and said paint quantity data, to said central computing device; and said central computing device comprises a computing program product that when installed on said central computing device causes said central computing device to perform a central computing process comprising the steps of:
 C1) receiving said target repair data from said terminal computing device;
 C2) producing one or more preliminary matching formulas according to said target repair data;
 C3) generating individual matching images having matching image R,G,B values based on color characteristics interrelated to each of the preliminary matching formulas;
 C4) displaying the individual matching images having said matching image R,G,B values on a supply center display device;
 C5) generating a target image having target R,G,B values based on the color characteristics of the target coating;
 C6) displaying the target images having said target R,G,B values on said supply center display device;
 C7) receiving a selection input for selecting said matching formula from said one or more preliminary matching formulas; and
 C8) outputting said matching formula to an output device.

Any of the aforementioned output devices can be suitable. In one example, the output device can be a computer monitor. In another example, the output device can be a printer. In yet another example, the output device can be a computing device, a data storage device, a database, or a combination thereof. In yet another example, the output device can be a dispensing device. In yet another example, the output device can be a combination of the aforementioned output devices.

The system can comprise a formula database comprising interrelated repair formulas, vehicle identification data of vehicles, paint codes of vehicles, and color characteristics, wherein said one or more preliminary matching formulas are produced by retrieving one or more stored formulas at said supply center from said formula database according to said vehicle identification data and said paint code of said vehicle and said color characteristics of the target coating.

The one or more preliminary matching formulas are produced by any of the aforementioned processes.

The system can further comprise a component database comprising coating components each interrelated with color characteristics, appearance characteristics, or a combination thereof, wherein said one or more preliminary matching formulas are produced by selecting from said component database one or more coating components, ratios of the one or more coating components, or a combination thereof, according to said color characteristics of the target coating and color characteristics interrelated with each of said one or more coating components.

This disclosure is also directed to a system for repairing one or more defects of a target coating of a vehicle, said system comprising:

A) a supply center (10) comprising at least one central computing device for producing a matching formula, a plurality of coating components, at least one dispensing device and at least one mixing device for dispensing and mixing coating components based on the matching formula to produce a matching coating composition; and B) at least one repair facility (11) comprising at least one terminal computing device in communication with said central computing device, at least one color measuring device for obtaining color characteristics of the target coating, at least one appearance measuring device for obtaining appearance characteristics of said target coating, at least one data input device for obtaining and inputting vehicle identification data and a paint code of said vehicle into said terminal computing device, at least one terminal display device, and at least one coating application device;

wherein:

said terminal computing device comprises a computing program product that when installed on said terminal computing device causes said terminal computing device to perform a terminal computing process comprising the steps of:
  T1) receiving said vehicle identification data and said paint code of said vehicle, said color characteristics and said appearance characteristics of said target coating;
  T2) receiving size data of the defects and producing paint quantity data based on said size data; and
  T3) transmitting target repair data comprising said vehicle identification data and said paint code of said vehicle, said paint quantity data, said color characteristics and said appearance characteristics of said target coating to said central computing device; and said central computing device comprises a computing program product that when installed on said central computing device causes said central computing device to perform a central computing process comprising the steps of:
  C1) receiving said target repair data from said terminal computing device;
  C2) producing one or more preliminary matching formulas according to said target repair data;
  C3) generating individual matching images having matching image R,G,B values based on color characteristics and appearance characteristics interrelated to each of the preliminary matching formulas;
  C4) displaying the individual matching images having said matching image R,G,B values on a supply center display device;
  C5) generating a target image having target R,G,B values based on the color characteristics and the appearance characteristics of the target coating;
  C6) displaying the target images having said target R,G,B values on said supply center display device;
  C7) receiving a selection input for selecting said matching formula from said one or more preliminary matching formulas; and
  C8) outputting said matching formula to an output device.

Any of the aforementioned output devices can be suitable. Any appearance measuring devices that are known to those skilled in the art can be suitable. The appearance measuring device can also include the appearance reference standards.

The system can comprise a formula database comprising interrelated repair formulas, vehicle identification data of vehicles, paint codes of vehicles, color characteristics and appearance characteristics, wherein said one or more preliminary matching formulas can be produced by retrieving one or more stored formulas at said supply center from said formula database according to said vehicle identification data and said paint code of said vehicle and said color and appearance characteristics of the target coating.

The one or more preliminary matching formulas are produced by any of the aforementioned processes.

The system can comprise a component database comprising coating components each interrelated with color characteristics, appearance characteristics, or a combination thereof, wherein said one or more preliminary matching formulas can be produced by selecting from said component database one or more coating components, ratios of the one or more coating components, or a combination thereof, according to said color appearance characteristics of the target coating and color appearance characteristics interrelated with each of said one or more coating components.

The terminal computing device and central computing device in any of the aforementioned systems can be positioned at different locations and can be connected via wired or wireless connections.

The supply center can further comprise a central color measuring device, one or more central coating application devices, or a combination thereof.

The central computing process can further comprise the steps of receiving test coating data comprising testing color characteristics of a testing coating from said central color measuring device.

The central computing process can further comprise the steps of:
  G1) adjusting said matching coating composition to form a modified matching coating composition by comparing said test coating data with said color characteristics of the target coating.

The central computing process can even further comprise the steps of:
  G2) generating a testing image having testing R,G,B values based on said test color characteristics;
  G3) displaying said testing image having said testing R,G,B values on said supply center display device; and
  G4) receiving input for adjusting said matching coating composition to form a modified matching coating composition according to a comparison of said testing image and said target image displayed on said supply center display device.

The test coating data can further comprise test appearance characteristics of the test coating and the central computing process can further comprise the step of:
  G1a) adjusting said matching coating composition to form a modified matching coating composition by comparing said test coating data with said color characteristics and appearance characteristics of the target coating.

The central computing process can further comprise the step of:

G2a) generating a testing image having testing R,G,B values based on said test color characteristics and said test appearance characteristics;

G3a) displaying said testing image having said testing R,G,B values on said supply center display device; and G4a) receiving input for adjusting said matching coating composition to form a modified matching coating composition according to a comparison of said testing image and said target image displayed on said supply center display device.

The system can further comprise one or more storage facilities at said supply center for storing said plurality of coating components. The system can further comprise an inventory monitoring system to obtain inventory data of said plurality of coating components in said storage facility. The system can even further comprise a resupply system for resupply said coating components at said supply center according to said inventory data. The system can even further comprise a delivery means for delivering said matching coating composition from the supply center to one or more repair facilities.

The dispensing device can be coupled to the central computing device directly or via a database or other data transfer devices to receive paint mixing data for automatically dispensing coating components into the mixing device. The paint mixing data can be generated according to said matching formula and a target paint quantity data. The target paint quantity data can be produced according to the paint quantity data.

The system can further comprise a feedback database for obtaining, storing and sharing feedback data, wherein said feedback database can be accessible via wired or wireless connections from one or more authorized computing devices, the central computing device, the terminal computing device, or a combination thereof. Any of the aforementioned feedback data can be suitable.

The system can comprise one or more aforementioned shading databases.

The system can comprise one or more supply centers and one or more repair facilities. The system can also comprise one supply center and two or more repair facilities. The system can also comprise two or more supply centers and one repair facility. The system can also comprise two or more supply centers and two or more repair facilities.

The system can further comprise one or more sets of color reference standards, one or more appearance reference standards, or a combination thereof. The system can also comprise the color reference standard database, the appearance reference standard database, or a combination thereof.

In further example, the system can comprise:

A) a supply center (10) comprising at least one central computing device for producing a matching formula, a plurality of coating components, at least one dispensing device and at least one mixing device for dispensing and mixing coating components based on the matching formula to produce a matching coating composition; and B) at least one repair facility (11) comprising at least one terminal computing device in communication with said central computing device, at least one color measuring device for obtaining color characteristics of the target coating, at least one data input device for obtaining and inputting vehicle identification data and a paint code of said vehicle into said terminal computing device, at least one terminal display device, at least one coating application device, and optionally at least one appearance measuring device;

wherein:

said terminal computing device comprises a computing program product that when installed on said terminal computing device causes said terminal computing device to perform a terminal computing process comprising the steps of:

T1) receiving said vehicle identification data and said paint code of said vehicle, said color characteristics and optionally said appearance characteristics of said target coating;

T2) receiving size data of the defects and producing paint quantity data based on said size data; and T3) transmitting target repair data comprising said vehicle identification data and said paint code of said vehicle, said paint quantity data, said color characteristics and optionally said appearance characteristics of said target coating to said central computing device; and said central computing device comprises a computing program product that when installed on said central computing device causes said central computing device to perform a central computing process comprising the steps of:

C1) receiving said target repair data from said terminal computing device;

C2) producing one or more preliminary matching formulas according to said target repair data;

C3) receiving a selection input for selecting said matching formula from said one or more preliminary matching formulas; and C4) outputting said matching formula to an output device.

What is claimed is:

1. A system for repairing one or more defects of a target coating of a vehicle, said system comprising:

A) a supply center (10) comprising at least one central computing device for producing a matching formula, a plurality of coating components, at least one dispensing device and at least one mixing device for dispensing and mixing coating components based on the matching formula to produce a matching coating composition; and B) at least one repair facility (11) comprising at least one terminal computing device in communication with said central computing device, at least one color measuring device for obtaining color characteristics of the target coating, at least one data input device for obtaining and inputting vehicle identification data and a paint code of said vehicle into said terminal computing device, at least one terminal display device, and at least one coating application device;

wherein:

said terminal computing device comprises a computing program product that when installed on said terminal computing device causes said terminal computing device to perform a terminal computing process comprising the steps of:

T1) receiving said vehicle identification data and said paint code of said vehicle and said color characteristics of the target coating;

T2) receiving size data of the defects and producing paint quantity data based on said size data; and T3) transmitting target repair data comprising said vehicle identification data and said paint code of said vehicle, said color characteristics of the target coating, and said paint quantity data, to said central computing device; and said central computing device comprises a computing program product that when installed on said central computing device causes said central computing device to perform a central computing process comprising the steps of:
- C1) receiving said target repair data from said terminal computing device;
- C2) producing one or more preliminary matching formulas according to said target repair data;
- C3) generating individual matching images having matching image R,G,B values based on color characteristics interrelated to each of the preliminary matching formulas;
- C4) displaying the individual matching images having said matching image R,G,B values on a supply center display device;
- C5) generating a target image having target R,G,B values based on the color characteristics of the target coating;
- C6) displaying the target images having said target R,G,B values on said supply center display device;
- C7) receiving a selection input for selecting said matching formula from said one or more preliminary matching formulas; and
- C8) outputting said matching formula to an output device.

2. The system of claim 1 further comprising a formula database comprising interrelated repair formulas, vehicle identification data of vehicles, paint codes of vehicles, and color characteristics, wherein said one or more preliminary matching formulas are produced by retrieving one or more stored formulas at said supply center from said formula database according to said vehicle identification data and said paint code of said vehicle and said color characteristics of the target coating.

3. The system of claim 2, wherein said one or more preliminary matching formulas are produced by retrieving one or more stored formulas at said supply center from said formula database according to said vehicle identification data and said paint code of said vehicle and said color characteristics of the target coating, and adjusting the stored formulas retrieved from said formula database according to the color characteristics of the target coating and color characteristics associated with each of the stored formulas using an adjusting process selected from: a linear shading process, a non-linear shading process, a vector shading process, an artificial intelligence (AI) modeling process, a neural networks (NN) modeling process, or a combination thereof.

4. The system of claim 1 further comprising a component database comprising coating components each interrelated with color characteristics, appearance characteristics, or a combination thereof, wherein said one or more preliminary matching formulas are produced by selecting from said component database one or more coating components, ratios of the one or more coating components, or a combination thereof, according to said color characteristics of the target coating and color characteristics interrelated with each of said one or more coating components.

5. A system for repairing one or more defects of a target coating of a vehicle, said system comprising:
- A) a supply center (10) comprising at least one central computing device for producing a matching formula, a plurality of coating components, at least one dispensing device and at least one mixing device for dispensing and mixing coating components based on the matching formula to produce a matching coating composition; and
- B) at least one repair facility (11) comprising at least one terminal computing device in communication with said central computing device, at least one color measuring device for obtaining color characteristics of the target coating, at least one appearance measuring device for obtaining appearance characteristics of said target coating, at least one data input device for obtaining and inputting vehicle identification data and a paint code of said vehicle into said terminal computing device, at least one terminal display device, and at least one coating application device;

wherein:
said terminal computing device comprises a computing program product that when installed on said terminal computing device causes said terminal computing device to perform a terminal computing process comprising the steps of:
- T1) receiving said vehicle identification data and said paint code of said vehicle, said color characteristics and said appearance characteristics of said target coating;
- T2) receiving size data of the defects and producing paint quantity data based on said size data; and
- T3) transmitting target repair data comprising said vehicle identification data and said paint code of said vehicle, said paint quantity data, said color characteristics and said appearance characteristics of said target coating to said central computing device; and said central computing device comprises a computing program product that when installed on said central computing device causes said central computing device to perform a central computing process comprising the steps of:
- C1) receiving said target repair data from said terminal computing device;
- C2) producing one or more preliminary matching formulas according to said target repair data;
- C3) generating individual matching images having matching image R,G,B values based on color characteristics and appearance characteristics interrelated to each of the preliminary matching formulas;
- C4) displaying the individual matching images having said matching image R,G,B values on a supply center display device;
- C5) generating a target image having target R,G,B values based on the color characteristics and the appearance characteristics of the target coating;
- C6) displaying the target images having said target R,G,B values on said supply center display device;
- C7) receiving a selection input for selecting said matching formula from said one or more preliminary matching formulas; and
- C8) outputting said matching formula to an output device.

6. The system of claim 5 further comprising a formula database comprising interrelated repair formulas, vehicle identification data of vehicles, paint codes of vehicles, color characteristics and appearance characteristics, wherein said one or more preliminary matching formulas are produced by retrieving one or more stored formulas at said supply center from said formula database according to said vehicle identification data and said paint code of said vehicle and said color and appearance characteristics of the target coating.

7. The system of claim 6, wherein said one or more preliminary matching formulas are produced by retrieving one or more stored formulas at said supply center from said formula database according to said vehicle identification data and said paint code of said vehicle, and said color characteristics and appearance characteristics of the target coating, and adjusting the stored formulas retrieved from said formula database according to the color characteristics and appearance characteristics of the target coating and color characteristics and appearance characteristics associated with each of the stored formulas using an adjusting process selected from: a linear shading process, a non-linear shading process, a vector shading process, an artificial intelligence (AI) modeling process, a neural networks (NN) modeling process, or a combination thereof.

8. The system of claim 5 further comprising a component database comprising coating components each interrelated with color characteristics, appearance characteristics, or a combination thereof, wherein said one or more preliminary matching formulas are produced by selecting from said component database one or more coating components, ratios of the one or more coating components, or a combination thereof, according to said color appearance characteristics of the target coating and color appearance characteristics interrelated with each of said one or more coating components.

9. The system of claim 1, wherein said terminal computing device and said central computing device are positioned at different locations and are connected via wired connections or wireless connections.

10. The system of claim 1, wherein said supply center further comprises a central color measuring device, one or more central coating application devices, or a combination thereof.

11. The system of claim 10, wherein said central computing process further comprises the steps of receiving test coating data comprising testing color characteristics of a testing coating from said central color measuring device.

12. The system of claim 11, wherein said central computing process further comprises the steps of:
G1) adjusting said matching coating composition to form a modified matching coating composition by comparing said test coating data with said color characteristics of the target coating.

13. The system of claim 11, wherein said central computing process further comprises the steps of:
G2) generating a testing image having testing R,G,B values based on said test color characteristics;
G3) displaying said testing image having said testing R,G,B values on said supply center display device; and
G4) receiving input for adjusting said matching coating composition to form a modified matching coating composition according to a comparison of said testing image and said target image displayed on said supply center display device.

14. The system of claim 11, wherein said test coating data further comprises test appearance characteristics of the test coating and wherein said central computing process further comprises the step of:
G1a) adjusting said matching coating composition to form a modified matching coating composition by comparing said test coating data with said color characteristics and appearance characteristics of the target coating.

15. The system of claim 11, wherein said test coating data further comprises test appearance characteristics of the test coating and wherein said central computing process further comprises the steps of:
G2a) generating a testing image having testing R,G,B values based on said test color characteristics and said test appearance characteristics;
G3a) displaying said testing image having said testing R,G,B values on said supply center display device; and
G4a) receiving input for adjusting said matching coating composition to form a modified matching coating composition according to a comparison of said testing image and said target image displayed on said supply center display device.

16. The system of claim 1 further comprising one or more storage facilities at said supply center for storing said plurality of coating components.

17. The system of claim 16 further comprising an inventory monitoring system to obtain inventory data of said plurality of coating components in said storage facility.

18. The system of claim 17 further comprising a resupply system for resupply said coating components at said supply center according to said inventory data.

19. The system of claim 1 further comprising a delivery means for delivering said matching coating composition from said supply center to said repair facility.

20. The system of claim 1, wherein said dispensing device is coupled to said central computing device to receive paint mixing data to automatically dispense coating components into the mixing device, said paint mixing data are generated according to said matching formula and a target paint quantity data.

21. The system of claim 20, wherein said target paint quantity data is produced according to said paint quantity data.

22. The system of claim 1 further comprising a feedback database for obtaining, storing and sharing feedback data, wherein said feedback database is accessible via wired or wireless connections from one or more authorized computing devices, said central computing device, said terminal computing device, or a combination thereof.

23. The system of claim 1 further comprising one or more sets of color reference standards, one or more appearance reference standards, or a combination thereof.

24. The system of claim 5, wherein said appearance characteristics of the target coating are derived from the vehicle identification number (VIN) or part of the VIN of the vehicle, a set of appearance reference standards, or a combination thereof.

25. A system for repairing one or more defects of a target coating of a vehicle, said system comprising:
A) a supply center (10) comprising at least one central computing device for producing a matching formula, a plurality of coating components, at least one dispensing device and at least one mixing device for dispensing and mixing coating components based on the matching formula to produce a matching coating composition; and
B) at least one repair facility (11) comprising at least one terminal computing device in communication with said central computing device, at least one color measuring device for obtaining color characteristics of the target coating, at least one data input device for obtaining and inputting vehicle identification data and a paint code of said vehicle into said terminal computing device, at least one terminal display device, at least one coating application device, and optionally at least one appearance measuring device for obtaining appearance characteristics of the target coating;
wherein:
said terminal computing device comprises a computing program product that when installed on said terminal computing device causes said terminal computing device to perform a terminal computing process comprising the steps of:
T1) receiving said vehicle identification data and said paint code of said vehicle, said color characteristics and said appearance characteristics of said target coating;

T2) receiving size data of the defects and producing paint quantity data based on said size data; and T3) transmitting target repair data comprising said vehicle identification data and said paint code of said vehicle, said paint quantity data, said color characteristics and said appearance characteristics of said target coating to said central computing device; and said central computing device comprises a computing program product that when installed on said central computing device causes said central computing device to perform a central computing process comprising the steps of:

C1) receiving said target repair data from said terminal computing device;

C2) producing one or more preliminary matching formulas according to said target repair data;

C3) receiving a selection input for selecting said matching formula from said one or more preliminary matching formulas; and C4) outputting said matching formula to an output device.

* * * * *